United States Patent

Fawcett

(10) Patent No.: US 6,364,798 B1
(45) Date of Patent: Apr. 2, 2002

(54) SPROCKET FOR ROLLER CHAIN DRIVES

(75) Inventor: John Neville Fawcett, Northumberland (GB)

(73) Assignee: Ford Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/509,154

(22) PCT Filed: Sep. 29, 1998

(86) PCT No.: PCT/GB98/02903

§ 371 Date: Mar. 22, 2000

§ 102(e) Date: Mar. 22, 2000

(87) PCT Pub. No.: WO99/17038

PCT Pub. Date: Apr. 8, 1999

(30) Foreign Application Priority Data

Sep. 30, 1997 (GB) ............................................. 9720725

(51) Int. Cl.⁷ .............................................. F16H 55/06
(52) U.S. Cl. ........................................ 474/161; 474/155
(58) Field of Search ................................ 474/152, 155, 474/156, 161, 163, 160, 153

(56) References Cited

U.S. PATENT DOCUMENTS

| | | | | |
|---|---|---|---|---|
| 586,991 A | * | 7/1897 | Curley | 474/156 |
| 1,056,240 A | * | 3/1913 | Webster | 474/84 |
| 1,870,801 A | * | 8/1932 | Engstrom | 474/156 |
| 3,052,133 A | * | 9/1962 | Bradley | 198/327 |
| 3,257,860 A | * | 6/1966 | Runde et al. | 474/94 |
| 4,867,733 A | * | 9/1989 | Yamanoi et al. | 474/161 |
| 5,074,827 A | * | 12/1991 | Bandy, Jr. | 474/157 |
| 5,476,422 A | * | 12/1995 | Schendel | 474/49 |
| 5,829,850 A | * | 11/1998 | Ketting et al. | 305/194 |
| 5,848,948 A | * | 12/1998 | Allen | 474/156 |
| 5,976,045 A | * | 11/1999 | Young | 474/160 |

FOREIGN PATENT DOCUMENTS

| | | | | |
|---|---|---|---|---|
| GB | 1166324 | * | 10/1969 | F16H/7/06 |

* cited by examiner

*Primary Examiner*—David A. Bucci
*Assistant Examiner*—Vicky A. Johnson
(74) *Attorney, Agent, or Firm*—Carlos Hanze

(57) ABSTRACT

A roller chain and sprocket drive includes a roller chain having multiple rollers and articulated links, the rollers being arranged with a substantially constant pitch and connected by the articulated links, and a sprocket in driving or driven engagement with the roller chain. The sprocket includes: angularly spaced sprocket teeth arranged for driving or driven engagement with the rollers wherein the spacing between at least some of the sprocket teeth is a multiple of the pitch of the rollers such that during each rotation of the sprocket at least some of the rollers pass over the sprocket and have no driving or driven connection with the sprocket; spoked portions extending radially from a sprocket axis corresponding to the sprocket, each of the spoked portions having an outer end for supporting a corresponding one of the sprocket teeth, wherein the spoked portions flex tangentially under load sufficiently to accommodate variations in the distance between adjacent rollers from the average pitch; and a support profile between adjacent ones of the sprocket teeth having an arc centered on the sprocket axis, the arc having a radius substantially equal to the root radius of the sprocket teeth, the support profile comprising resilient inserts extending towards the sprocket axis between the spoked portions.

5 Claims, 2 Drawing Sheets

SPROCKET FOR ROLLER CHAIN DRIVES

FIELD OF THE INVENTION

This invention relates to roller chain and sprocket drives.

BACKGROUND OF THE INVENTION

Roller chain and sprocket drives are commonly used for transmitting torque from one shaft to another, for example for driving the camshafts of an internal combustion engine from the crankshaft. Such drive systems may be prone to undesirable levels of noise or wear.

When a roller in a roller chain engages with a sprocket tooth an impact occurs. This impact is caused by the geometry of the drive and also by manufacturing tolerances on the chain and the sprocket. The impact may be considered to have two components, one perpendicular to the span of chain from which the roller is being picked up, and one along the chain. It is the component along the chain span which is the cause of much of the high frequency noise from a roller chain drive. The perpendicular component of the impact is generally of smaller magnitude and not as significant as a noise source. In addition to causing noise, the impacts increase the loading on the chain and the sprockets, so reducing the fatigue life of the chain.

Thus each time a sprocket tooth picks up a roller from a chain span, noise and vibration are excited. Only a few of the sprocket teeth, those nearest the end of the span from which the sprocket is picking up rollers, are active in carrying the load and transmitting it between the sprocket and the chain.

It is known from FR 572 312 A (DRANCÉ) to provide a sprocket with tooth spacing that is a multiple of the pitch of the chain.

OBJECT OF THE INVENTION

The invention seeks to provide an improved roller chain and sprocket drive that is capable of reducing noise or wear level in certain applications.

SUMMARY OF THE INVENTION

According to the invention, a roller chain and sprocket drive system comprises:

a roller chain having multiple rollers arranged with a substantially constant pitch and connected by articulated links;

a sprocket in driving or driven engagement with the roller chain, the sprocket having angularly spaced teeth arranged for driving or driven engagement with the rollers;

the spacing between at least some adjacent teeth is a multiple of the pitch of the chain rollers so that during each rotation of the sprocket at least some of the chain rollers passing over the sprocket have no driving or driven connection with the sprocket;

the sprocket is formed with a support profile (23) between adjacent driving/driven teeth; and the support profile follows an arc centred on the sprocket axis and of radius substantially equal to the root radius of the sprocket teeth CHARACTERISED IN THAT the support profiles are provided by resilient inserts;

the resilient inserts extend towards the sprocket axis between spoke portions;

the driving/driven teeth are formed at the outer end of spoke portions; and the spoke portions flex tangentially under load sufficiently to accommodate variations in the distance between adjacent rollers from the average pitch.

The design of a sprocket according to the present invention intended for use with any given roller chain has fewer teeth than a conventional sprocket so that some rollers do not engage on a tooth. The number of impacts which occur, and have components along the chain, are thus significantly reduced and the effects of the components of the impacts which are perpendicular to the chain span can be reduced. The invention provides additional flexibility at the tooth and thereby provides cushioning of longitudinal impacts as the rollers engage with the sprocket teeth. The invention may also provide improved distribution of forces between the teeth in engagement with the span of chain around the sprocket by accommodating tolerances in the sprocket and the chain. The invention will provide quieter chain drives and will also improve the fatigue life of the chain. The design is such that the relative rotation of the rollers on their bearings will also be reduced, so reducing the work done against friction and increasing the drive efficiency. The invention can be applied to all roller chain drives and in particular to high speed drives such as camshaft drives in internal combustion engines.

BRIEF DESCRIPTION OF THE DRAWINGS

The invention will now be described further, by way of example, with reference to the accompanying drawings, in which.

DETAILED DESCRIPTION OF THE DRAWINGS

Figure 1:
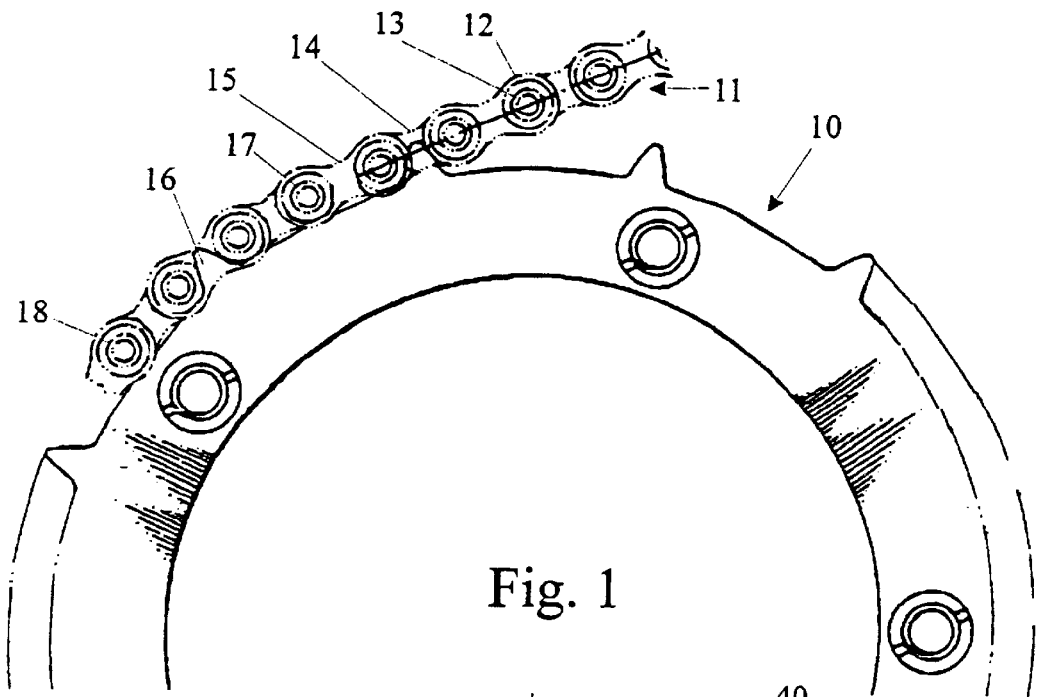
FIG. 1 is a front view of a chain and sprocket drive.

Referring to FIG. 1, a roller chain and sprocket drive comprises a sprocket 10 mounted on a shaft not shown and a roller chain 11. The roller chain comprises multiple rollers 12 mounted on bearings 13 interconnected by inner links 14 and outer links 15. Adjacent links are free to articulate about the axis of bearings 13.

A span of the roller chain 11 extends around the sprocket 10 with the rollers engaging sprocket teeth 16 to provide a driving or driven connection between the chain and the sprocket. In the conventional manner, the chain passes in a loop around other sprockets on driving/driven shafts and or idler shafts (not shown) so that torque is transferred from one shaft to the other.

The teeth 16 fit between the links 14, 15 to locate the chain laterally of the sprocket.

In a conventional sprocket the spacing of the teeth is equal to the pitch of the rollers in the chain, that is the distance between the axes of adjacent rollers on the chain. In the sprocket 10, the spacing between adjacent teeth 16 is three times the pitch of the rollers in the chain. This has the effect that some of the rollers 17 and 18 have no driving or driven connection with the sprocket 10 during that pass around the sprocket 10. It is preferred, however, that the number of links in the chain be chosen such that all the rollers are used to provide driving engagement at some stage during different passes of the chain around the sprocket. In this case of the illustrated sprocket 10, this can be achieved by ensuring that the number of links in the chain is not divisible by three.

Figure 2:
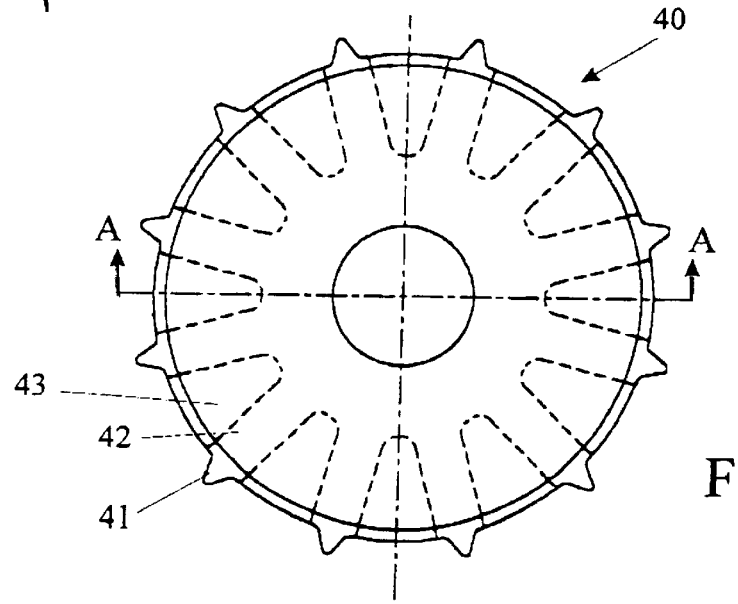
FIGS. 2 and 3 (which is a section along the line A—A in FIG. 2) show an embodiment of the invention, the profile of a sprocket having 12 teeth which would replace a conventional sprocket with 36 teeth and with deep inserts between the teeth.

Referring to FIG. 2, the sprocket 40 has only twelve of the thirty six teeth of a conventional sprocket of the same pitch circle diameter. The twelve teeth 41 are of conventional design and the tooth profiles are joined by circular arcs. Only the chain rollers which are in contact with the teeth 41 transmit the driving torque. The other rollers in contact with the sprocket 40 rest on the circular arcs between the teeth and transmit none of the driving torque. These rollers are subject only to forces directed radially outwards. With this design the longitudinal impacts in the chain occur at only one third of the frequency at which they would occur with a conventional sprocket and chain. Any number of teeth could be omitted from a conventional sprocket provided that a satisfactory drive results.

Figure 3:
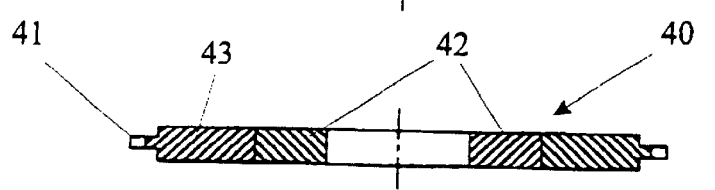

Referring to FIGS. 2 and 3, the teeth 41 are formed at the outer ends of arms 42 made from steel or other suitable material, embedded in a plastics moulding 43. The arms (which are shown as being radial but need not necessarily be so) allow additional flexibility at the tooth and thereby provide cushioning of longitudinal impacts as the rollers engage with the sprocket teeth. This embodiment may also provide improved distribution of forces between the teeth in engagement with the span of chain around the sprocket by accommodating tolerances in the sprocket and the chain.

Figure 4:
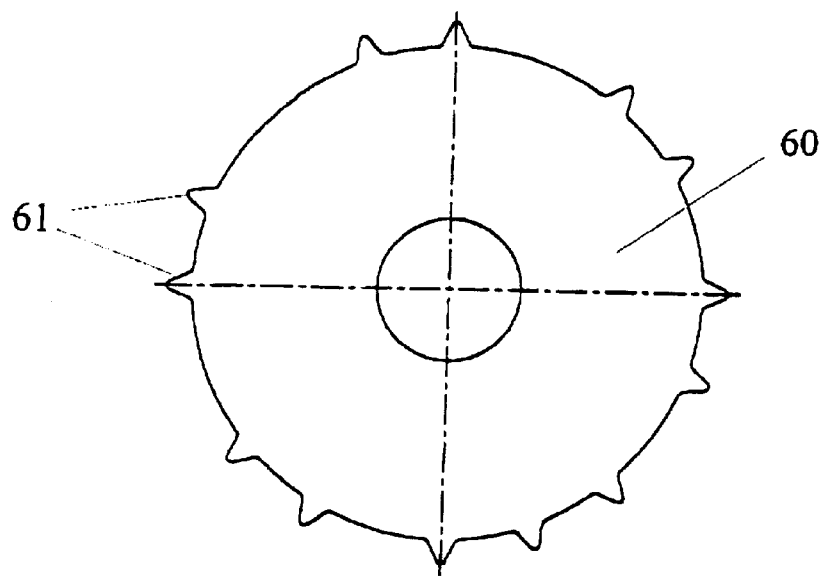
FIG. 4 shows an alternative sprocket profile in which the teeth are unevenly spaced.

Referring to FIG. 4, a sprocket 60 is shown in which the teeth 61 are spaced at irregular intervals around the sprocket. The teeth must, of course, be located so that there is an exact number of chain pitches between any two teeth. The teeth may be formed as in FIG. 2 and embedded in a plastics moulding.

Figure 5:
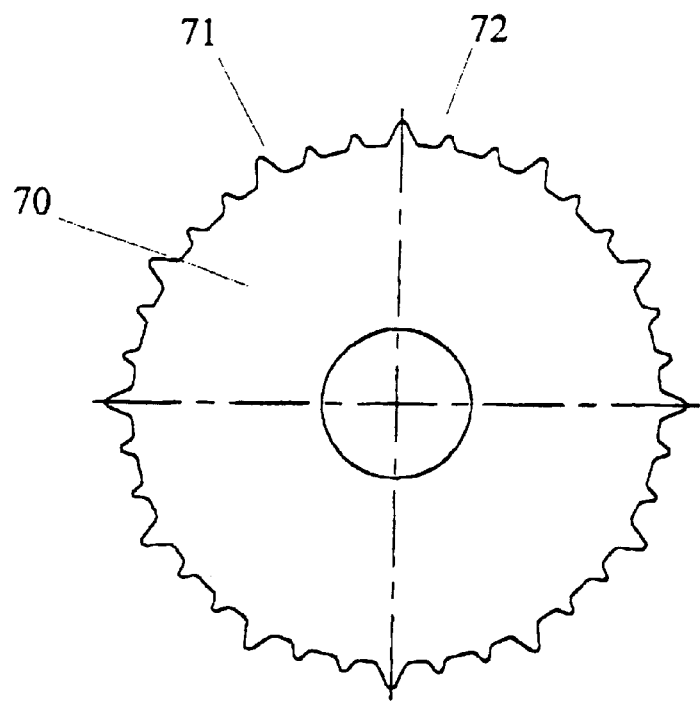
FIG. 5 shows a further alternative sprocket configuration having non-driving teeth between the driving teeth.

Referring to FIG. 5, a sprocket 70 is shown with driving teeth 71 similar to those shown in FIG. 1. Between the driving teeth 71, smaller non-driving teeth 72 are shown which do not make contact with the chain rollers. These additional non-driving teeth 72 are used to provide improved lateral location of the chain on the sprocket where this is needed, but do not transmit tangential forces from the chain to the sprocket or vice versa.

The non-driving teeth may be formed as part of the plastics moulding in a construction similar to that in FIGS. 2 and 3.

What is claimed is:

1. A drive system comprising:
   a roller chain having multiple rollers and articulated links, said rollers being arranged with a substantially constant pitch and connected by said articulated links; and
   a sprocket in driving or driven engagement with said roller chain, the sprocket comprising:
      angularly spaced sprocket teeth arranged for driving or driven engagement with said rollers wherein the spacing between at least some of said sprocket teeth is a multiple of the pitch of said rollers such that during each rotation of said sprocket at least some of said rollers pass over said sprocket and have no driving or driven connection with said sprocket;
      spoked portions extending radially from a sprocket axis corresponding to said sprocket, each of said spoked portions having an outer end for supporting a corresponding one of said sprocket teeth, wherein the spoked portions flex tangentially under load sufficiently to accommodate variations in the distance between adjacent rollers from the average pitch; and
      a support profile between adjacent ones of said sprocket teeth having an arc with a radius of curvature centered on the sprocket rotational axis, said arc having a radius substantially equal to the root radius of the sprocket teeth, said support profile comprising resilient inserts extending towards the sprocket axis between said spoked portions.

2. The drive system according to claim 1, wherein each of said sprocket teeth is equally spaced from adjacent ones of said sprocket teeth by two or more times the pitch of said chain rollers.

3. The drive system according to claim 1, wherein the number of said rollers in said chain is such that during continuous operation all of said rollers provide driving engagement during some passes of said chain around said sprocket.

4. The drive system according to claim 1, wherein successive ones of said sprocket teeth are non-uniformly spaced.

5. The drive system according to claim 1, wherein said sprocket further comprises one or more guide teeth disposed between said sprocket teeth, said guide teeth being smaller than said sprocket teeth and providing lateral location of said chain on said sprocket without transmitting tangential forces between said chain and said sprocket.

* * * * *